United States Patent

[11] 3,596,243

| | | | |
|---|---|---|---|
| [72] | Inventor | Stephen W. Leibholz | |
| | | Rydal, Pa. | |
| [21] | Appl. No. | 811,472 | |
| [22] | Filed | Mar. 28, 1969 | |
| [45] | Patented | July 27, 1971 | |
| [73] | Assignee | Analytics Incorporated | |

[54] TWO-UNIT ANTITHEFT DEVICE
8 Claims, 3 Drawing Figs.

[52] U.S. Cl. .................................................. 340/64,
340/63
[51] Int. Cl. ...................................................... B60r 25/00,
G08b 13/00
[50] Field of Search ................................... 307/10;
180/114; 340/63, 64, 65, 216

[56] References Cited
UNITED STATES PATENTS

| | | | | |
|---|---|---|---|---|
| 3,058,092 | 10/1962 | Johnson | | 340/64 |
| 3,284,787 | 11/1966 | Voigt et al. | | 340/227 |
| 3,310,775 | 3/1967 | Birth | | 340/63 |
| 3,343,625 | 9/1967 | Scheuermann | | 180/114 |
| 3,419,729 | 12/1968 | Hall | | 307/10 |
| 3,422,398 | 1/1969 | Rubin | | 340/63 |
| 3,430,058 | 2/1969 | Yoshida | | 307/10 |
| 3,464,060 | 8/1969 | Arditti | | 340/64 |
| 3,513,466 | 5/1970 | Isaacs et al. | | 340/274 |

*Primary Examiner*—John W. Caldwell
*Assistant Examiner*—Howard S. Cohen
*Attorney*—Warren L. Soffian ABSTRACT: An electronic anti-theft device for an automobile including a dashboard unit and an engine compartment unit. The dashboard unit is equipped with a combination lock mechanism which in the undialed position is operative to short out both the automobile ignition coil and the distributor. The dashboard unit also includes an armored cable which houses a folded over ignition wire and wires from both the distributor and ignition coil. The engine compartment unit includes three separate but related embodiments, each of which includes means for enabling the automobile horn to provide an audible alarm as long as the combination lock is not correctly dialed or an attempt is made to disable the dashboard unit and to steal the automobile.

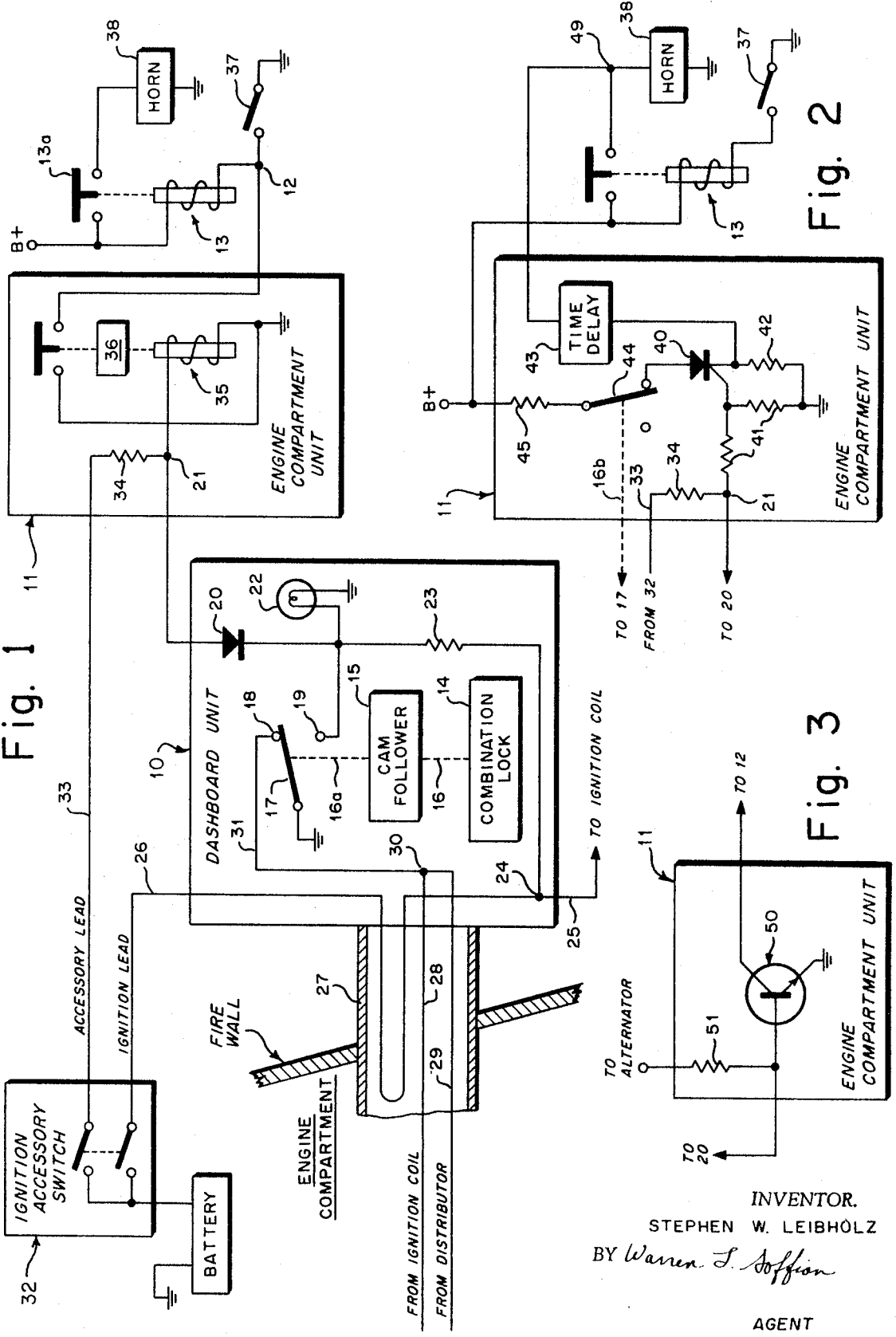

3,596,243

1

TWO-UNIT ANTITHEFT DEVICE

BACKGROUND OF THE INVENTION

This invention relates to an antitheft device for an automobile or other vehicle. More particularly, this invention relates to an electrical dashboard and engine compartment antitheft device, the dashboard portion functioning independently of the ignition key circuit and in conjunction with the distributor and ignition coil circuits and engine compartment portion functioning in conjunction with the automobile horn circuits.

Many automobile antitheft devices are on the market today. These devices generally consist of key operated switches and/or hidden conventional toggle switches or the like. The devices are generally placed in series with the ignition circuit from the battery and must be unlocked by the key or toggled, respectively, before starting the automobile. Such devices are relatively easy to defeat, however, and suffer from the limitation that they may be compromised from but one access position within the automobile.

There has therefore arisen a need for an automobile antitheft device which overcomes the limitations of prior existing devices, which includes features for completely disabling the automobile in the event that the antitheft device is tampered with, and which requires entrance to more than one access position within the automobile before complete compromise can be achieved.

SUMMARY OF THE INVENTION

Accordingly, it is the general object of the present invention to provide a combination lock, automobile antitheft device having a number of multiple check features which prevent its compromise without working both under the dashboard and the hood of the automobile.

The invention comprises a dashboard unit which is secured to the automobile dashboard and an engine compartment unit which may be secreted under the hood within the engine compartment. The dashboard unit is preferably of single unit metallic construction having an armored cable extending from the rearward portion thereof and through the automobile firewall into the engine compartment. The armored cable houses an ignition wire folded over to form a U-shaped configuration, the ends of which extend into the dashboard unit, and further houses both a wire from the ignition coil and a wire from the distributor. The ignition coil and distributor wires are connected within the engine compartment unit to form a junction therein. The dashboard unit comprises a combination lock which opens and closes a switch through suitable mechanical linkage. The switch is grounded at one end thereof and in the undialed combination lock position is in contact with the junction formed by the ignition coil and distributor wires so as to ground the ignition coil and distributor. Also included is an indicator lamp and circuit logic.

The engine compartment unit includes three related embodiments, the first of which comprises a time delay relay which in the undialed combination lock position closes a preset time after ignition turn-on to permit the automobile horn to be energized. The second engine compartment embodiment also includes a time delay but further comprises electronic means for insuring the continued energization of the automobile horn irrespective of the position of the ignition-accessory switch. The third engine compartment unit embodiment energizes the horn while the combination lock is in the undialed position but when the dashboard unit logic has nonetheless been defeated.

DESCRIPTION OF THE DRAWING

FIG. 1 is a schematic representation of the dashboard unit and an engine compartment unit in accordance with the invention;

2

FIG. 2 is a schematic representation of a second engine compartment unit for use with the dashboard unit of FIG. 1; and FIG. 3 is a schematic representation of yet another engine compartment unit for use with the dashboard unit of FIG. 1.

DESCRIPTION OF THE PREFERRED EMBODIMENT

Referring now to the drawing and more particularly to FIG. 1 thereof, there is shown a dashboard unit 10 operatively connected to an engine compartment unit 11. The engine compartment unit 11 is connected to a terminal 12 of horn solenoid 13. The dashboard unit 10 comprises a combination lock 14 and a cam follower unit 15, cam follower 15 being driven by the combination lock mechanism through appropriate mechanical linkage 16. The cam follower 15 drives a switch arm 17 through the linkage 16a. The switch arm 17 is pivotally connected to ground at one end thereof and is movable at its other end to contact circuit points 18 and 19, respectively. Point 19 is connected to the cathode of a diode 20, the anode of which is connected at point 21 in the engine compartment unit 11. Also connected to the point 19 is a lamp 22 (having one side thereof grounded) and a resistor 23. The other side of the resistor 23 is connected to one side of the automobile ignition coil (not shown) at the point 24 via the lead 25.

Coming into the top of the dashboard unit 10 from the automobile ignition-accessory switch 32 is the automobile ignition wire 26. This wire is routed through and out of the back portion of the dashboard unit 10 and is folded back on itself to form a U-shaped member. One end of this U-shaped member remains within the unit 10 (the other end being connected to switch 32) while the rest of the folded over wire 26 is routed through an armored cable 27 which is bolted or otherwise secured to the case of unit 10. The cable 27 also includes therein a wire 28 from the other side of the ignition coil and a wire 29 from the distributor. These two wires are connected together at the point 30 within the dashboard unit 10 and are routed via the lead 31 to the contact 18. Thus in the position shown in FIG. 1, the ignition coil and distributor are grounded out through the switch arm 17. That end of the ignition wire 26 which is not connected to switch 32 is connected at point 24 within the unit 10 (and hence to the ignition coil via lead 25).

In the assembled embodiment of FIGS. 1, 2, and 3, the armored cable 27 is secured to the back portion of the dashboard unit 10 and extends therefrom through the firewall of the automobile and into the engine compartment wherein it is connected to the ignition coil and distributor. The dashboard unit 10 may be securely bolted at any convenient place under the automobile dashboard. Preferably, the unit 10 is mounted so that ignition lead 26 is concealed behind the dashboard and led into the top of unit 10 (through an aperture provided therein) without being exposed to view.

The automobile ignition-accessory switch 32 may be of the double pole, single throw-type, as shown. Of course, the present invention may be utilized with other known ignition-accessory switches, the switch of FIG. 1 being shown for illustrative purposes only. Switch 32 is connected to the positive terminal of the automobile battery and provides power upon the closure thereof both to the ignition coil and to the various accessories of the automobile. One of the many accessory leads, accessory lead 33 to the horn, is shown in FIG. 1. This lead has been broken and the engine compartment unit 11 has been inserted between the ignition-accessory switch 32 and the horn solenoid 13. Accordingly, the accessory wire 33 is shown connected through a resistor 34 to the point 21 within the engine compartment unit 11. The point 21 is connected to the relay coil portion of a time delay relay 35. This relay may comprise a mechanical dashpot 36 or the like which permits the closure of the relay only after a predetermined period of delay. Of course, an entirely electrical time delay may be provided in lieu of relay 35, the configuration shown being presented for convenience only. The output terminal of relay 35 is connected to the point 12 of the horn solenoid 13, the output terminal of which is connected to the horn 38. It is noted that in the normal operation of the horn 38 the switch 37 (which is generally positioned on the steering wheel of the automobile) is closed. Closing this switch allows power from the battery to flow through the coil of the solenoid 13, thereby closing the contacts thereof. Upon contact closure, power is provided through the solenoid arm 13a whereupon the horn 38 provides an audible signal.

FIG. 2 is a modification of the engine compartment unit 11 of FIG. 1. Referring now to FIG. 2, there is shown an SCR 40 having a gate or control electrode connected to a voltage divider comprising resistors 41. The voltage divider 41 is connected to the point 21 and hence to accessory lead 33, through resistor 34, and to the anode of diode 20. The cathode of the SCR 40 is connected to ground through an appropriate resistor 42. The cathode is also connected to a time delay unit 43 having a preselectable delay time. The output terminal of delay 43 is connected directly at point 49 to the horn 38 so as to bypass the horn solenoid 13. Power from the battery is supplied to the horn solenoid as discussed heretofore. In addition, however, power is also supplied through an appropriate resistor 45 and a normally closed switch 44 to the anode of the SCR 40. Also connected to this switch 44 is mechanical linkage 16b, which linkage connects the switch 44 with the switch arm 17 of the dashboard unit 10. Accordingly, switch 44 is slave to switch arm 17. Of course, it is to be understood that the mechanical linkage 16b is representative only, this connection being readily affectuated electrically, for example, if desired.

FIG. 3 is yet another modification of the engine compartment unit 11. In this embodiment a transistor 50 has its collector connected to the point 12 of the horn solenoid 13. The emitter is grounded and the base is connected to the alternator or generator of the automobile through an appropriate resistor 51. The base is also connected to the anode of the diode 20 within the dashboard unit 10.

Referring again to FIG. 1, the operation of the system therein will be explained. So long as the correct combination of lock 14 is not dialed, the ignition coil and distributor coil are grounded together through switch arm 17. Accordingly, any attempt to start the car will be futile. However, a would-be car thief is initially unaware of this, and for purposes of illustration it may be assumed that upon entry to the automobile he attempts to close the ignition-accessory switch 32. Closure of this switch is ineffective to start the automobile as while power may be considered to flow through the ignition lead 26 to the ignition coil via the point 24 and the line 25, the other side of the ignition coil is grounded through arm 17. In addition, closure of the switch 32 provides power via the accessory lead 33 and across resistor 34 to the point 21 on the coil of time delay relay 35. After a predetermined time, relay 35 closes so that the point 12 is placed at ground potential. This completes the circuit for power to flow from the battery and through the solenoid 13. Upon this occurrence, the solenoid 13 itself is closed to provide power to horn 38. Thus the horn provides an audible alarm signal which will continue as long as the ignition-accessory switch 32 remains closed.

It is further noted that closing the ignition-accessory switch 32 lights the lamp 22 since power from the battery flows through the ignition lead 26 and across the resistor 23 to the lamp 22. The lighted lamp warns the owner of the automobile that he has the time preset within the time delay 35 to dial the correct combination before the horn 38 is sounded. The would-be thief may also see the lighted lamp but he will not realize the significance thereof. The values of resistance for resistors 23 and 34, respectively, are chosen so that the voltage drops thereacross back bias the diode 20. Accordingly, no current flows therethrough.

As noted above, since the lamp 22 lights substantially upon closing the switch 32 but the horn does not blow until the time delay relay 35 is closed, a visual indication that the combination lock has not been dialed is provided.

The time delay 35 can be defeated (and hence the system can be defeated) merely by opening ignition-accessory switch 32. This is not the case with the embodiment of FIG. 2, discussed hereinafter. However, it should be noted that even through the ignition-accessory switch 32 is opened so that the horn 38 ceases to provide an audible alarm, the automobile is still not capable of being started as the ignition and distributor coils have been shorted out.

In order to defeat the system of FIG. 1, it is therefore necessary to cut the armored cable 27 and resplice the appropriate wires. The problem with such an obvious approach, however, resides in the twofold fact that the cable is armored and hence relatively impervious to being severed; and secondly, for all intents and purposes, it appears that there are four wires located therein since the ignition wire 26 has been folded over on itself. The would-be thief, even if he does succeed in severing the armored cable 27, thus finds himself with an additional wire with no place to connect it.

To defeat the system of FIG. 1, it is necessary upon severing armored cable 27 to jump the ignition wire 26 from the point at the ignition-accessory switch 32 to the point 24 within the dash unit 10. Additionally, it is necessary for the ignition coil wire 28 and distributor wire 29 to be connected to their appropriate and respective positions within the engine compartment of the automobile. Finally, accessory lead 33 must be severed for while the automobile may now be started, the horn will still provide an audible alarm.

Of course, as an added safety precaution the automobile may be equipped with an appropriate hoodlock which would necessitate either breaking the lock or breaking through the firewall of the automobile to make these connections. It is therefore to be appreciated that while the system of FIG. 1 may be defeated other than by dialing the combination, much time, labor, and effort as well as considerable destruction to the automobile is necessary.

Dialing the correct combination immediately defeats the system. When this is done the switch arm 17 is moved by the cam follower via the linkage 16a to the contact 19 position. This immediately opens the connection between the ignition coil and distributor coil so that these two elements are no longer shorted out, and the automobile may therefor be started. Additionally, closing the ignition-accessory switch 32 causes power to drop across the resistor 34 and the diode 20 to ground through the switch arm 17. Since the diode 20 is selected to have a forward resistance considerably less than that of the coil of time delay relay 35, the current flows through the diode and not the relay. Similarly, since the lamp 22 has a considerable resistance, the current flows only through the diode 20 and at point 19 through the switch arm 17 to ground, thereby extinguishing the lamp.

Referring again to FIG. 2, the operation of this embodiment will be explained. As can be seen from FIG. 2, closure of the ignition-accessory switch provides power to the gate of SCR 40 through the voltage divider 41 which, for convenience, may be considered to divide the battery supply voltage in half, thereby providing approximately 6 volts to the SCR 40 gate. Upon receiving this voltage, the SCR 40 is enabled and power is supplied therethrough to the time delay 43 after dropping across resistor 45, passing through closed switch 44, and dropping across resistor 42 to ground. It is noted that time delay 43 may comprise resistive and capacitive elements, the period of time delay being determined by the RC time constant. In this embodiment, if the the ignition-accessory switch 32 is opened, the SCR 40 having been once enabled will continue to conduct power from the battery. Accordingly, after the delay time the current from the battery passes through the delay 43 to the point 49, thereby energizing the horn. Thus, the horn 38 will continue to provide an audible alarm irrespective of the position of ignition-accessory switch 32.

It is noted that the time delay 43 may include therein a forward biased unidirectional impedance element such as a diode so that current cannot flow back into the time delay upon the normal closure of the switch 37.

The circuit shown in FIG. 2 can be defeated by dialing the combination of combination lock 14. Otherwise, it is necessary to break armored cable 27, make the necessary connections, sever lead 33, and destroy or open SCR 40. It is noted that severing lead 33 once the SCR 40 has been enabled is ineffective to disable the horn 38. Similarly, breaking the linkage 16b also does not disable horn 38 as SCR 40 remains enabled.

Upon dialing the correct combination, the switch arm 17 is driven to the contact 19 position (as in FIG. 1) and simultaneously mechanical linkage 16b moves the switch arm 44 to the open position, thereby open circuiting the battery at that point and opening the SCR circuit so that the horn 38 is no longer energized.

FIG. 3 is yet another embodiment of the engine compartment unit 11. This embodiment is similar to those shown in FIGS. 1 and 2 in that it is necessary for the would-be thief to cut the armored cable 27 and jump the appropriate wires before the automobile starts. Thus when the ignition-accessory switch 32 is closed, the automobile does not start as the ignition coil and distributor are shorted out as discussed heretofore. Upon realizing, therefore, that he must cut the armored cable 27 and jump the appropriate wires, the would-be thief may be able to start the automobile. However, when this happens in the embodiment of FIG. 3, the transistor 50 senses the alternator or generator field voltage; and when sufficient voltage is developed across the resistor 51, the collector of the transistor drops rapidly to ground, thereby grounding the point 12. This then completes the horn circuit so that power from the battery is supplied to the horn 38 in the manner heretofore described and the horn is energized. Horn 38 will continue to provide an audible alarm until the engine is shut off.

The invention has thus been shown to be directed toward a two-unit antitheft device for an automobile or other vehicle. Each unit functions substantially independently of the other and likewise provides separate protective functions. For example, in the embodiment of FIG. 1, cutting the accessory lead 33 disables the engine compartment unit 11 and hence the horn 38. However, the automobile still will not start as the ignition coil and distributor are shorted out. It is therefore necessary to additionally sever cable 27 and make the appropriate connections, as discussed heretofore, in order to completely compromise the device.

Similarly, in the embodiment of FIG. 2, even assuming that the dashboard unit 10 has been compromised, the horn 38 will continue to provide an audible alarm signal. Moreover, once SCR 40 has been enabled, cutting accessory lead 33 is ineffective to disable engine compartment unit 11.

With respect to the embodiment of FIG. 3, it is noted that disabling unit 10 is ineffective to disable transistor 50. Accordingly, the horn 38 will provide an audible alarm signal. Moreover, no connections exit between units 10 and 11, the cutting of which will disable the horn.

It is, of course, to be understood that many modifications and alterations are possible in light of the above teachings. For example, not only the automobile horn but also some or all of the other automobile accessories may be connected to unit 11 to provide additional alarms. It is further contemplated, for example, that the output signal from unit 11 may trip a relay to thereby energize a secreted tape recorder which blasts a pretaped message that the automobile is being stolen. Accordingly, it is only with reference to the appended claims that the breadth of the invention should be ascertained.

I claim:

1. A two-unit antitheft device for an automobile comprising:
   a. first means connected to the dashboard of said automobile for housing one of said two antitheft units;
   b. an ignition lead folded over on itself to form a U-shaped member and having one end thereof connected to the ignition-accessory switch of said automobile and the other end thereof extending into said first means and connected to a junction point;
   c. first impedance means connected between said junction point and a first contact;
   d. an ignition coil wire;
   e. a distributor wire, said ignition coil wire and said distributor wire extending from the automobile ignition coil and distributor respectively, into said first means and connected together therein to a second contact;
   f. an armored cable secured to said first means for housing said ignition lead and said ignition coil and distributor wires;
   g. switch means including a grounded switch arm pivotally connected to and within said first means for movement between said first and said second contacts, whereby said ignition coil wire and said distributor wire are connected to ground through said switch arm when said switch arm is contacting said second contact and said ignition coil wire and said distributor wire are connection to an open terminal when said switch arm is contacting said first contact;
   h. a combination lock mounted on the face of said first means and operatively connected to move said switch arm to said first contact when the correct combination of said lock is dialed; and
   i. second means positioned within the engine compartment of said automobile for housing a second of said two-unit antitheft units, said second means operatively connected to the ignition-accessory switch of said automobile and said first contact for providing an enabling signal to an alarm-producing utilization device.

2. A two-unit antitheft device according to claim 1 wherein said second unit provides said enabling signal to said utilization device responsive to the closure of said automobile ignition-accessory switch and only when said switch arm is in communication with said second contact.

3. A two-unit antitheft device according to claim 1 wherein said first means further comprises:
   a. a cam follower connected between said lock and switch arm for moving said arm responsive to the dialed condition of said lock;
   b. an indicator lamp connected to said first contact for lighting said lock when said ignition-accessory switch is closed and said first contact is open; and
   c. unidirectional impedance means connected to said second contact and said second unit for preventing said second unit from receiving electrical energy from said first means.

4. A two-unit antitheft device according to claim 2 wherein said second unit comprises:
   a. second impedance means connected between said ignition-accessory switch and said first contact; and
   b. time delay relay means operatively connected to said first contact and said second impedance means for providing said enabling signal a predetermined time after the closure of said ignition-accessory switch.

5. A two-unit antitheft device according to claim 2 wherein said second unit comprises:
   a. an electric switch having a control electrode;
   b. a voltage divider connected to said ignition-accessory switch and said control electrode for providing a control signal thereto;
   c. a time delay connected to said electronic switch for providing said enabling signal a predetermined time after said electronic switch receives said control signal; and
   d. means connected to said electronic switch for prohibiting the passage of said enabling signal when the combination of said lock is correctly dialed.

6. A two-unit antitheft device according to claim 5 wherein said electronic switch comprises a silicone-controlled rectifier and said voltage divider comprises a first and second resistor, said first resistor connected to said ignition-accessory switch and the control electrode of said rectifier and said second resistor connected to ground and the control electrode of said rectifier.

7. A two-unit antitheft device according to claim 2 wherein said second unit comprises:
   a. a electronic switch having a control electrode; and
   b. second impedance means connected to said control electrode and a voltage source of said automobile, said electronic switch providing said enabling signal upon the occurrence of a predetermined voltage being developed across said second impedance means.

8. A two-unit antitheft device according to claim 7 wherein said electronic switch comprises a transistor having the emitter thereof grounded and the collector thereof connected to provide said enabling signal.